Patented Aug. 4, 1931

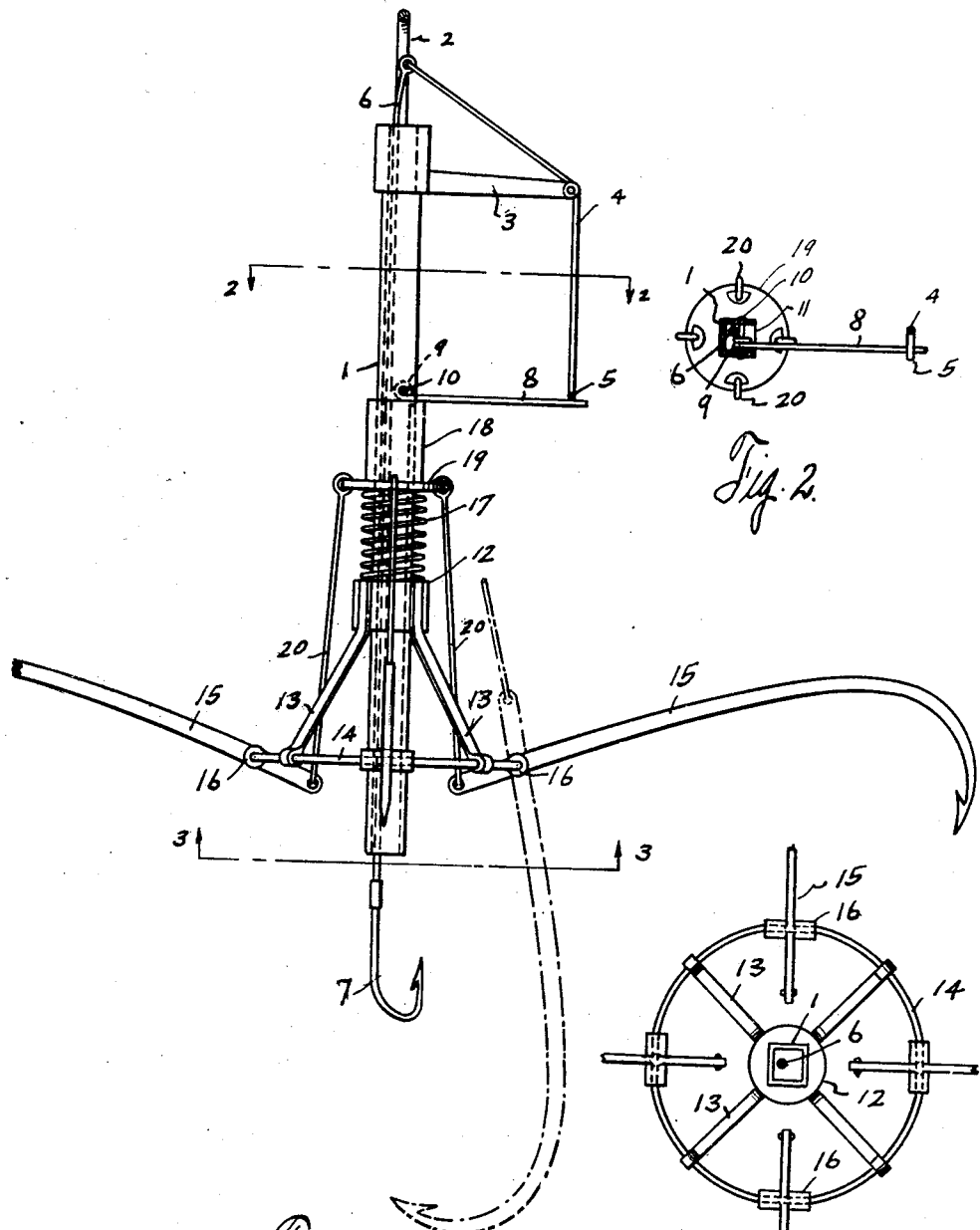

1,817,185

UNITED STATES PATENT OFFICE

THOMAS J. GOODRUM, OF HOUSTON, TEXAS

FISH TRAP

Application filed May 9, 1930. Serial No. 450,930.

This invention relates to new and useful improvements in a fish trap.

One object of the invention is to provide a device of the character described specially designed for the purpose of catching fish and the like and which embodies a plurality of snare hooks which may be set and latched in open position, and a bait hook provided to carry the bait, with intermediate means through which a pull on the bait hook will operate to release the snare hooks, and other means for actuating the released snare hooks into active, or engaging, position.

With the above and other objects in view this invention has particular relation to certain novel features of construction operation and arrangement of parts an example of which is given in this specification and illustrated in the accompanying drawings, wherein:—

Figure 1 shows a fragmentary side view of the trap, partly in section.

Figure 2 shows a cross sectional view taken on the line 2—2 of Figure 1, and

Figure 3 shows a cross sectional view taken on the line 3—3 of Figure 1.

In the drawings the numeral 1 designates a tubular shank one end of which has an anchor 2 for attachment of the fishing line. Extending laterally from the upper end of this shank there is an anchor arm 3 and a trigger 4 has a bearing on the outer end of said arm.

One end of this trigger has the overturned portion 5 and the other end of said trigger is extended inwardly and is pivotally connected to one end of the bait-hook shaft 6. The other end of said shaft 6 has the bait hook 7 attached thereto. There is a latch 8 whose inner end is formed into a bearing, 9, around the cross pin 10. This latch may work through a side slot 11 in the shank and is normally held retracted within the shank, as hereinafter explained.

Around and attached to the shank 1 there is an anchor 12 and attached to this anchor there are the arms 13 which diverge toward the bait hook. The outer ends of the arms support an anchor ring 14. There are a plurality of snare hooks 15, each having a bearing 16 on the ring 14. Around the shank 1 there is a coil spring 17 one end of which rests against the outer end of the anchor 12 and seated against the other end of this spring there is a sleeve 18 having the outwardly extending flange 19 thereon. Links 20 are pivotally connected, at one end, to said flange 19, and at their other ends to the inner ends of the hooks 15.

In order to set the trap the sleeve 18 is moved along the shank toward the anchor 12, placing the spring 17 under compression, and operating through the links 20, to swing the snare hooks outwardly into the position shown in full lines in Figures 1 and 3. The latch 8 is then swung outwardly and its free end is engaged against the overturned end 5 of the trigger 4. The outward pressure of the sleeve 18 against the latch 8 will retain said latch in such engaging relation with said trigger. Bait is placed on the bait hook 7 and when the fish takes the bait a pull will be exerted on the shaft 6 and the trigger 4 will be released from the latch 8 and the spring 17 will suddenly force the sleeve 18 outwardly, retracting the latch through the slot 11 and also operating, through the links 20, to throw the hooks 15 into the position shown in dotted lines in Figure 1, and into the fish, securely holding the same.

What I claim is:

A trap of the character described including a supporting shank, a plurality of snare hooks pivotally supported on the shank, a slidable sleeve on the shank, links connecting said sleeve with said hooks, a yieldable member working against said sleeve, a pivotally mounted trigger, a shaft associated with said shank, a bait hook attached to one end of said shaft and surrounded by said snare hooks, the other end of said shaft being connected to said trigger, a latch pivoted on said shank and adapted to work against said sleeve to place said yieldable member under compression said latch being engageable with said trigger and being held thereby to maintain such compression.

In testimony whereof I have signed my name to this specification.

THOMAS J. GOODRUM.